United States Patent [19]

Heinze et al.

[11] 4,077,945

[45] Mar. 7, 1978

[54] PROCESS FOR MAKING LINEAR POLYESTERS FROM ETHYLENE GLYCOL AND TEREPHTHALIC ACID

[75] Inventors: Helmut Heinze, Frankfurt am Main; Eberhard Häckel, Hochstadt, both of Germany

[73] Assignee: Zimmer Aktiengesellschaft, Germany

[21] Appl. No.: 788,291

[22] Filed: Apr. 18, 1977

Related U.S. Application Data

[63] Continuation of Ser. No. 559,027, Mar. 17, 1975, abandoned.

[30] Foreign Application Priority Data

Mar. 23, 1974 Germany .............................. 2414122

[51] Int. Cl.$^2$ ........................ C08G 63/22; C07C 69/76
[52] U.S. Cl. .................................. 260/75 M; 560/79; 560/89
[58] Field of Search .......................... 260/75 M, 475 P

[56] References Cited

U.S. PATENT DOCUMENTS

| | | | |
|---|---|---|---|
| 3,487,049 | 12/1969 | Busot | 260/75 M |
| 3,590,072 | 6/1971 | Leybourne | 260/75 M |
| 3,655,729 | 4/1972 | Rinehart | 260/75 M |
| 3,689,461 | 9/1972 | Balint et al. | 260/475 P |
| 3,697,579 | 10/1972 | Balint et al. | 260/75 M |
| 3,892,798 | 7/1975 | Heeg et al. | 260/475 P |

*Primary Examiner*—Eugene C. Rzucidlo
*Attorney, Agent, or Firm*—Allegretti, Newitt, Witcoff & McAndrews

[57] ABSTRACT

A batch process for esterifying ethylene glycol and terephthalic acid at elevated temperature and pressure in which a part of the ethylene glycol required for the complete esterification reaction is placed in an autoclave and heated under pressure, and the remainder of the glycol is added to said heated glycol in the form of a paste with terephthalic acid. Preferably the glycol initially present in the autoclave amounts to 0.3 to 0.8 moles per mole of terephthalic acid while the glycol added as a paste amounts to 1.4 to 0.9 moles per mole of terephthalic acid. The glycol initially in the autoclave may be glycol reclaimed from the mixture volatilized during the reaction and may contain up to 20% water, preferably 2-6% water.

6 Claims, 1 Drawing Figure

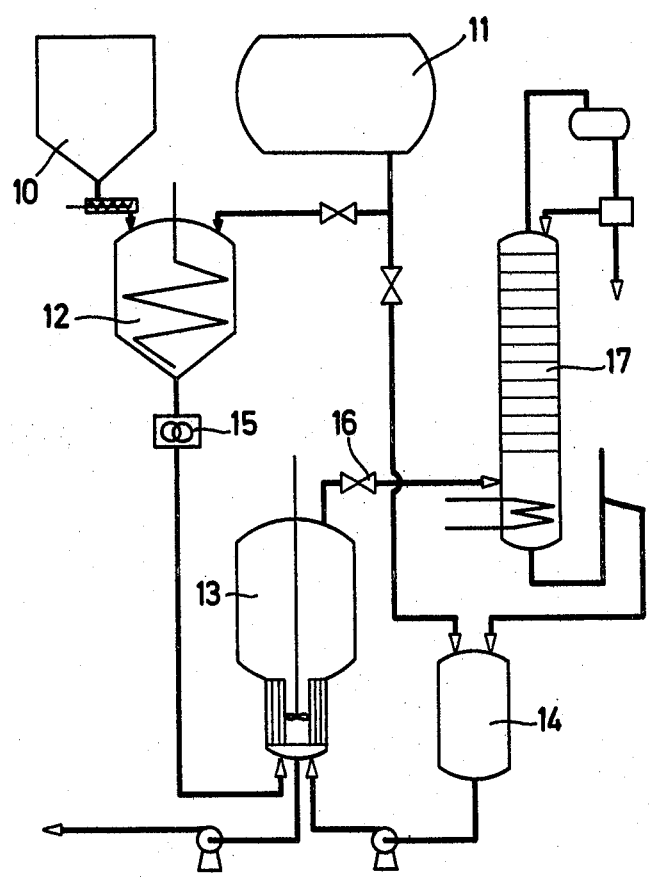

PROCESS FOR MAKING LINEAR POLYESTERS FROM ETHYLENE GLYCOL AND TEREPHTHALIC ACID

This is a continuation of application Ser. No. 559,027, filed Mar. 17, 1975, now abandoned.

The invention relates to a process for making linear polyesters by discontinuous esterification of ethylene glycol and terephthalic acid at molar ratios of 1.1:1 to 2.0:1, in which at the commencement of the esterification reaction heated glycol is placed in the reaction vessel and the terephthalic acid is fed into the heated glycol. A polycondensation process follows the esterification reaction.

PRIOR ART

In the production of polyesters of a large commercial scale the starting substances used were predominantly dimethyl terephthalate and ethylene glycol which were reacted by an ester-interchange process into bis-$\beta$-hydroxyethylterephthalate. Since nowadays less expensive terephthalic acid is available in sufficient purity, an endeavor is made to react this with the glycol through a so-called direct esterification to the glycol terephthalate. In this there prove to be disadvantages: the low solubility of the terephthalic acid in boiling glycol at atmospheric pressure, the associated low esterification speed, as well as the abundant formation of undesired by-products, such as, for example, diethylene glycol.

A special problem stems from the difficulty that the terephthalic acid tends on heating in a suspension of terephthalic acid and glycol, especially with a slight glycol excess, severely to agglomerate, whereby the conveyance and homogenization as well as the heat exchange of the suspension are rendered much more difficult.

It is known to increase the reaction speed by placing molten esterification product or precondensate in the reaction vessel and to feed the reactants terephthalic acid and ethylene glycol into the reactor, and carrying out the esterification at a temperature above the normal boiling point of the glycol, preferably at 240° to 280° C. This requires that the esterification product needed for the reactor be separately prepared or retained.

Since a part of the esterification product has to remain in the reactor for the following charge or batch, cleaning of the reactor is impossible and a change of the charges or of the formula is made difficult. Above all, however, the space-time yield of the reactor is unsatisfactory, since the retained reaction product occupies a part of the reactor volume. Furthermore, the esterification speed is less than it would be if glycol were substituted for the reaction product under otherwise comparable conditions. Finally, heating of the supplied esterification product or precondensate is more difficult than, for example, the heating of glycol.

It is likewise a prior-known practice to bring together the reactants for direct esterification by feeding pulverulent terephthalic acid at a low molar ratio into the boiling glycol (German patent application OS No. 2,210,655). The exact dosage and feeding of the powder into the reactor, lacks control because the terephthalic acid powder tends to lump under the influence of the reactor vapors. If the acid is introduced as a stream into the reactor standing under excess pressure, it is difficult to obtain the necessary homogenization of the terephthalic acid in the supplied glycol or reaction mixture. In the prior-known processes, it is necessary to select certain grain sizes or grain size distributions of the terephthalic acid in order to keep the reaction mixture fluid. Large particles, however, counteract a short reaction time.

THE INVENTION

The object of the invention, therefore, is to provide a process of the kind described in which, despite its simplicity, the reactants are homogeneously distributed, and in which during a short reaction time, or with a high space-time yield, the quantity of undesired by-products is minimized.

According to the invention ethylene glycol (in an amount of 0.1 to 1.4, preferably 0.3 to 0.8 moles per mole of terephthalic acid) is heated at elevated pressure to a temperature above 200° C. A paste of terephthalic acid containing 1.9 to 0.6, preferably with 1.4 to 0.9 moles of ethylene glycol per mole of terephthalic acid, is fed into the prepared ethylene glycol, and the esterification reaction is commenced at a temperature of 200° to 290° C, preferably of 240° to 270° C, and at an initial pressure of 1 to 15, preferably 4 to 8 atmospheres pressure, which is lowered as the reaction proceeds.

Through the cooperation of all the process parameters, despite a low molar ratio, there are achieved short reaction times with a high degree of conversion, while simultaneously, the proportions of by-products formed can be kept very low. There are no sharp limits in regard to the useable grain sizes of the terephthalic acid. A further advantage of the process of the invention is that for the first charge of reactants no esterification product has to be separately prepared or retained in the reactor. The reactor is completely emptied after each charge, so that its cleaning and a change of the charges are facilitated. It is much easier to heat the glycol than to melt up and temper the esterification product in the first charge of a series of esterification reactions. Also, the feeding of a paste of terephthalic acid and ethylene glycol into heated ethylene glycol under pressure is better controlled than the feeding of solid, i.e., pulverulent, terephthalic acid into boiling glycol. Finally, the glycol provides a better space-time yield than does the esterification product. The reason for this is that the reactor can be completely emptied after each esterification reaction, and that the esterification speed with glycol is greater than with the esterification product under otherwise comparable conditions.

Stated another way the invention consists in providing initially in the reactor a part of the glycol required for the reaction and using the rest to prepare the paste. Surprisingly, it was possible to produce through this method a fully satisfactory space-time yield of a high quality end product. The precise amount of initially-provided glycol in the reactor within the indicated ranges is governed essentially by the dimensions of the reaction vessel, for example, according to the required size of the heat exchanger situated on the bottom of the reactor. The optimal amount of reactants can easily be determined by simple calculation. The amount of ethylene glycol used to prepare the paste depends, within the indicated limits, on the grain size distribution of the terephthalic acid.

All the usual and known additives can be used in the esterification reaction, for example, esterification catalysts such as titanium or tin compounds. For the further reduction of the ether formation, according to the process of the invention, known inhibitors, such as, for example, organic bases or alkali salts of weak acids, may be added.

Analogously the esterification reaction can also be carried out with addition of modifying agents and/or pigments. Suitable pigments are, for example, titanium dioxide, lampblack and color pigments.

The process of the invention is especially advantageously suited for using ethylene glycol condensed out of the reactor vapor and recovered, which contains 0.1 to 20%, preferably 2 to 6% of water. The water constituent has no adverse influence on the reaction. On the contrary the presence of the water constituent improves the flowability of the paste or the reaction mixture. Furthermore, the aqueous glycol can be advantageously used as receiver glycol for the paste, because it facilitates a very simple pressure control during the esterification. This pressure program assures, in a preferred form of the invention, a water evaporation rate constant with time. The reuse of glycol from the sump of the distillation column, which preferably still contains 2 to 6% of water, means that this column can be operated with a minimum expenditure of energy.

An especially advantageous variant of the process of the invention is that during the esterification reaction there is additionally supplied to the reaction vessel glycol in amounts up to 500 g/hr per kg of terephthalic acid. The glycol is fed into the bottom zone of the reaction vessel. Here it is possible easily to control the optimal relation between the degree of esterification and the formation of diethylene glycol. Furthermore, a more uniform loading of the column is thereby achieved, if such a column is located on the outlet side of the reactor.

DRAWING DESCRIPTION AND SPECIFIC EXAMPLES

A process diagram for the execution of the process of the invention, according to which the following examples were carried out, is explained in detail below with the aid of the FIGURE in the drawing.

Supply hopper 10 contains terephthalic acid. Storage tank 11 contains ethylene glycol. The reactants are fed into an agitating container 12 and homogenized to a readily flowable paste. Glycol flows from tank 11 to a heated container 14, and thence to autoclave 13. The paste is fed by means of a pump 15 into the preheated glycol in the autoclave under agitation. The vapor mixture rising during esterification passes through a relief valve 16 into a distillation column 17, where the water is separated off. The glycol deposited in the sump of the column 17 passes first into the container 14 and from there back into the autoclave 13.

The esterification product is then conveyed from the bottom of the autoclave into a polycondensation reactor, not shown. It can if desired be first prepolymerized to a degree of from 3 to 20 in the autoclave 13—as is known—through further reduction of the pressure, before it is transferred to the polycondensation reactor. Then it is polycondensed until the desired end viscosity is reached.

EXAMPLE 1

A paste was prepared from 2000 g of terephthalic acid, 972 g of glycol, 6 g of diisopropylamine annd 1.3 g of antimony triacetate, by mixing these ingredients as homogeneously as possible. 177 g of ethylene glycol were heated in the autoclave until a pressure of 5.0 atmospheres gauge was attained. At this point, 1370 g of the above paste was fed into the autoclave uniformly over a period of 60 minutes under agitation. The product temperature was adjusted to 270° C, and the superatmospheric pressure was maintained at 5 atmospheres, by operation of the relief valve. Ten minutes after the paste was fed in, the pressure was lowered continuously over a period of 25 minutes from 5.0 atmospheres to 0 atmosphere (gauge pressure) and then maintained for 5 minutes more at a temperature of 270° C. The vapors escaping through the relief valve were separated in a column at atmospheric pressure into condensed water and aqueous glycol. The esterification product had an acid number of 21.3 mg KOH/g and a diethylene glycol content of 1.14% by weight.

EXAMPLE 2

The esterification reaction according to Example 1 was repeated, the sole difference being that instead of pure glycol there were provided 177 g of recovered glycol having a water content of 5%. The esterification product had an acid number of 27.4 mg KOH/g with a diethylene glycol content of 1.07% by weight.

EXAMPLE 3

The esterification reaction according to Example 1 was repeated, the sole difference being that instead of pure glycol there was provided a mixture of 336 g of glycol and 18 g of water. The esterification product had an acid number of 14.2 mg KOH/g at a diethylene glycol content of 1.24% by weight. Subsequently, the esterification product was heated under nitrogen to 275° C and polycondensed under agitation for 3 hours at a temperature of 275° C and a pressure of 0.1 Torr. The polyethylene terephthalate obtained had an intrinsic viscosity of 0.90 (measured in phenol tetrachlorethane 60:40 at 25° C), with a —COOH end group content of 20 eq/$10^6$g and a diethylene glycol content of 1.4% by weight.

EXAMPLE 4

The esterification reaction according to Example 1 was repeated with the sole differences being that the paste was fed in over a period of 90 minutes, and a mixture of 510 g of glycol and 27 g of water was additionally fed in at the bottom of the autoclave. The esterification product obtained thereby had an acid number of 2.25 mg KOH/g with a diethylene glycol content of 1.88% by weight.

EXAMPLE 5

In an autoclave a mixture of 238 g of glycol and 13 g of water under a nitrogen atmosphere was heated until a pressure of 5.0 atmospheres had built up. At this point a paste consisting of 1142 g of terephthalic acid, 427 g of glycol, 3.4 g of diisopropylamine and 0.75 g of antimony triacetate was fed in continuously over a period of 90 minutes under steady agitation. During this time the temperature was maintained at 260° C and the pressure was maintained constant at 5.0 atmospheres by operation of the pressure relief valve. A mixture of 36 g of glycol and 2 g of water was then fed in at the bottom of the autoclave over a period of 30 minutes and the temperature was raised to 270° C. Fifteen minutes after completion of the feeding in of the paste, the pressure was lowered continuously over 25 minutes from 5.0 atmospheres gauge to atmospheric pressure. Ten minutes later the esterification reaction was arrested. The esterification product had an acid number of 22.2 mg/KOH/g and a diethylene glycol content of 1.07% by weight. After a 3-hour polycondensation reaction at 275° C and a pressure of 0.1 Torr, the esterification product was converted to a polyethylene terephthalate having an intrinsic viscosity of 0.89, a content in — COOH end groups of 24 eg/$10^6$ g and a diethylene glycol content of 1.11% by weight.

What is claimed is:

1. A process for making linear polyesters by discontinuous direct esterification of ethylene glycol and terephthalic acid at molar ratios of 1.1:1 to 2.0:1, in which at the beginning of the esterification reaction heated glycol is placed in the reaction vessel and the terephthalic acid is fed into the glycol, followed by polycondensation of the esterification product, the improvement comprising:

maintaining 0.1 to 1.4 moles of the glycol required for the esterification reaction per mole of the terephthalic acid at a temperature above 200° C at superatmospheric pressure in the said reaction vessel and in the substantial absence of terephthalic acid, preparing a terephthalic acid paste containing 1.9 to 0.6 moles of ethylene glycol per mole of terephthalic acid, initiating esterification by feeding said paste to said heated glycol in the reaction vessel over a period of time and under agitation, esterifying the resulting mixture at a temperature of between 200° to 290° C and a pressure of between 1 and 15 atmospheres, and lowering the pressure as the reaction proceeds.

2. The process of claim 1 in which said part of the glycol amounts to 0.3 to 0.8 mole per mole of terephthalic acid, the glycol in the paste amounts to 1.4 to 0.9 moles per mole of terephthalic acid, the esterification temperature is between 240° and 270° C and the esterification pressure is between 4 and 8 atmospheres 3. The process of claim 1 in which said part of the glycol contains from 0.1 to 20% water.

4. The process of claim 3 in which said part of the glycol contains from 2 to 6% water.

5. The process of claim 1 in which, during the esterification reaction, additional glycol is fed into the reaction vessel in amounts up to 500 g/hr per Kg of terephthalic acid.

6. The process of claim 1 in which said polycondensation is carried out in the same reaction vessel to a degree of from 3 to 20.

* * * * *